April 14, 1970          J. R. DAVY ET AL          3,506,208
APPARATUS FOR WINDING COHERENT GLASS FIBRE STRIPS
Filed Jan. 25, 1968
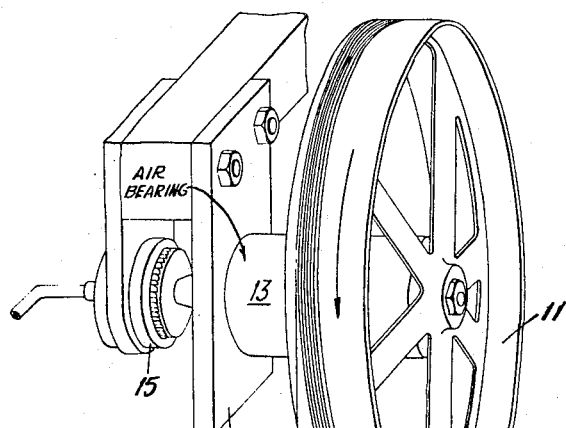
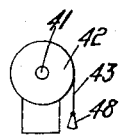
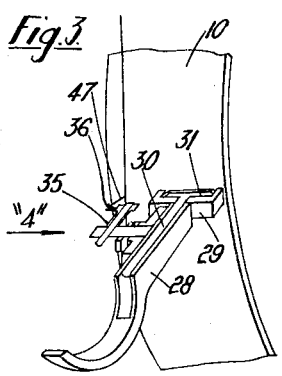
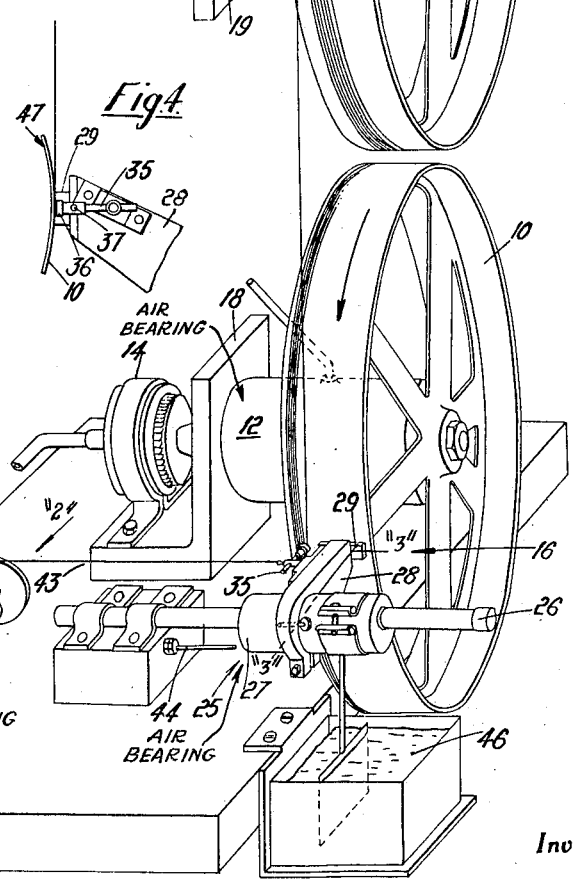
Inventors
JOHN R. DAVY & OSWALD J. HOUSTON
By Mason, Fenwick & Lawrence
Attorneys

United States Patent Office 3,506,208
Patented Apr. 14, 1970

3,506,208
APPARATUS FOR WINDING COHERENT
GLASS FIBRE STRIPS
John R. Davy and Oswald J. Houston, Glasgow, Scotland, assignors to Barr and Stroud Limited, Anniesland, Glasgow, Scotland, a British company
Filed Jan. 25, 1968, Ser. No. 700,561
Claims priority, application Great Britain, Apr. 12, 1967, 16,753/67
Int. Cl. B65h 54/02
U.S. Cl. 242—18                              8 Claims

ABSTRACT OF THE DISCLOSURE

Apparatus for winding coherent glass fibre strips includes a first wheel on the peripheral surface of which fibre is wound in random fashion from a fibre producing furnace. A second wheel having a polished peripheral surface receives fibre from the first wheel and a resiliently biased stylus engages the fibre as it is being wound onto the second wheel and presses it into engagement with the preceding fibre turn. A collar on the stylus prevents overlying or twisting of the fibres and the winding speed is controlled by the differential torque produced by air turbines which are coupled to drive the wheels in opposite directions.

---

This invention is concerned with apparatus for winding coherent glass fibre strips.

In light pipes using glass fibres, it is necessary, if a coherent picture is to be obtained at the viewing end, that the fibres forming the pipe have the same order and position at both ends of the pipe. Heretofore this has been done by hand i.e. fibres cut to the desired length have been laid side by side to form a strip, the ends of the strip have been cemented together and the pipe has been formed by placing a number of these strips so formed on top of each other. This manual process is slow, expensive, inaccurate and wasteful of delicate fibre.

It is an object of the present invention to provide apparatus for winding coherent glass fibre strips.

According to the present invention there is provided apparatus for winding coherent glass fibre strips, including two wheels mounted in air bearings and having parallel axes, driving means coupled with said wheels to wind a glass fibre from one wheel onto the other and means associated with the other wheel for correctly locating on said other wheel the fibre being wound thereon, said means including a pressure pad, and a stylus movable across the peripheral surface of the other wheel and associated with the pressure pad, which when supplied with air, supports the tip of the stylus at a predetermined distance from said peripheral surface.

The driving means may be air turbines coupled to drive the wheels in opposite directions whereby the differential torque drives the wheels.

Further according to the present invention there is provided a method of winding coherent glass fibre strips, including the steps of providing a supply of continuous glass fibre, winding said glass fibre onto the peripheral surface of a rotatable wheel mounted in air bearings and biasing each successive fibre turn into engagement with the preceding turn of fibre by means of a resiliently biased stylus reciprocally-movable across the peripheral surface of the said wheel.

An embodiment of the present invention will now be described, by way of example, with reference to the accompanying drawing, in which:

FIG. 1 is a perspective view of apparatus for winding coherent glass fibre strips according to the present invention;

FIG. 2 is a view in the direction of the arrow 2 in FIG. 1;

FIG. 3 is a view of a detail, partly in section taken on the line 3—3 of FIG. 1; and FIG. 4 is a view in the direction of the arrow 4 in FIG. 3.

Referring now to the drawing, apparatus for winding coherent glass fibre strips according to the present invention includes two winding wheels 10 and 11 having respectively bearings 12, 13 and driving means 14, 15 and means 16 for guiding a glass fibre onto the wheel 10.

The wheels 10 and 11 are accurately machined and balanced and have a polished peripheral surface. To reduce as far as possible their moment of inertia, they are made of a light alloy. The wheels are spaced at a convenient distance apart with their axes parallel and their inner edges, i.e. the edges nearest the bearings 12, 13, in line. A near tangential saw cut or slot 47 (FIGS. 3 and 4) is provided through the peripheral surface of the wheel 10, as will be explained hereinafter. Air bearings 12 and 13 support the wheels 10 and 11 respectively and are mounted on a base plate 17 by means of brackets 18 and 19 respectively, though, for reasons of clarity in the drawing the support for the bracket 19 is not shown. The wheels 10 and 11 are coupled respectively to air turbines 14 and 15; the latter being a clockwise turbine driving wheel 11 clockwise as seen in FIG. 1 and the former being an anticlockwise turbine driving wheel 10 anticlockwise as seen in FIG. 1. The turbines are of the nozzle and bucket type, the numbers of nozzles and bucket being different prime numbers to provide near pulse free drive at low speeds.

A third air bearing 25 is mounted on a fixed shaft 26 which is secured to the base plate 17 and extends parallel to the axis of the wheel 10 adjacent the wheel 10. The outer casing 27 of the bearing 25 is free to slide along the shaft 26 with the minimum of friction. Attached to the outer casing 27 is a projection 28 carrying at its end an air bearing pad 29 with a radius on its outer surface matching that of the wheel 10. Bores 30 and 31, as seen in FIG. 3 are provided in the projection 28 and pad 29 to pass compressed air from the bearing 25 to the outer face of the pad 29 in order to hold the pad 29 at a fixed distance from the peripheral surface of the wheel 10.

On the side of the projection 28 and extending parallel therewith, is fixed a stylus 35 consisting of a circular rod with a radius on its outer end the same as that of the wheel 10. The stylus 35 is made of hardened steel or is tipped with tungsten carbide, sapphire or diamond to resist wear as, in use, the stylus is in constant contact with a glass fibre. The stylus 35 is provided with an adjustable collar 36 which can be locked in any position by means of a grub-screw 37 (FIG. 4). A further air bearing 40 is provided mounting on its spindle 41 a pulley 42. A light cord 43 secured to the casing 27, passes over the pulley 42 and supports a small weight 48, thus biasing the casing 27 to the left on its shaft 26, as seen in FIG. 1. An adjustable stop 44 is provided to limit the travel of the casing 27 to a specific starting point. An oil dash pot 46 is provided to dampen the movement of the casing 27 and thus reduce any tendency of the stylus to bounce.

A common air supply, not shown, supplies all the bearings through taps, and also the turbines through adjustable valves.

In use the upper wheel 11 is wound in a relatively random manner by pulling a continuous length of glass fiber direct from a furnace. An end of the fibre from the upper wheel 11 is passed through the slot 47 on the lower wheel 10 and is fixed in position with adhesive tape on the inside of the wheel rim. Air is then supplied to the bearing 13 and to the turbine 15 which thus applies a tension or braking load to the fibre. Air is also supplied to the bearing 12 and to the turbine 14 at the same pressure so that the turbines 14, 15, acting against each other give no resultant movement. The bearings 25 and 10 are then supplied with air so that the pad 29 lifts clear of the periphery of the wheel 10 and the casing 27 floats along its shaft 26 under the influence of the weight 48 until it contacts the stop 44 which has been set so that in this position the side of the stylus 35 just contacts the fibre secured in the slot.

The stylus is set and locked so that in this position the gap between the stylus 35 and the peripheral surface of the wheel 10 is less than the thickness of the fibre, preferably less than half the fibre thickness, for example 0.0002" may be found suitable, and the collar 36 is adjusted on the stylus to give a clearance between the collar face and the peripheral surface of the wheel of not more than 25% greater than the fibre thickness.

Winding of the fibre onto the lower wheel takes place by increasing the air pressure to the turbine 14 to overcome the torque of the turbine 15 trying to drive the wheel 11. The wheel 10 is then rotated by the resultant differential torque in an anticlockwise direction, winding on the fibre which unwinds from and drives the wheel 11 against its turbine. The stylus 35 lays the first turn of fibre while remaining against the stop 44 and continues to lay each successive turn tightly against the previous turn by pressing sideways on the fibre at the point of contact with the wheel periphery.

Due to the constant pull of the weight 48 on the stylus, all subsequent turns of fibre are in contact with one another, irrespective of variation in the fibre thickness. The stylus moves across the peripheral surface of the wheel 10 as the winding proceeds and is always in contact with the last turn laid down. The stylus collar 36 serves to prevent fibres from building on top of one another and to ensure that square or other multi-sided fibres do not twist as they are laid down on the wheel 10.

When the required width of coherently wound fibre band has been obtained, the winding action is stopped by reducing the air pressure to the turbine 14 to that of the braking turbine 15. The wheels then come to rest without slackening of the fibre.

If desired, the fibre can be wholly or partly rewound onto the upper wheel 11 by reducing still further the air pressure to the turbine 14, thus allowing the braking turbine 15 to drive the wheels in reverse, i.e. clockwise as seen in FIG. 1.

The laid band of fibres can be made of any width that can be accommodated on the breadth of the lower wheel 3, or it can be arranged to be laid in a series of spaced band widths by an automatic stepping device arranged to advance the stylus a specific amount between each required band width.

What is claimed is:

1. Apparatus for winding coherent glass fibre strips, including two wheels mounted in air bearings and having parallel axes, driving means coupled with said wheels to wind a glass fibre from one wheel onto the other and means associated with the other wheel for guiding onto said other wheel the fibre wound thereon, said means including a pressure pad, and a stylus movable across the peripheral surface of the other wheel and associated with the pressure pad which, when supplied with air, supports the tip of the stylus at a predetermined distance from said peripheral surface.

2. Apparatus as claimed in claim 1, in which the stylus and the pressure pad are mounted on a third air bearing and are slidable on a shaft mounted parallel to the wheel axes.

3. Apparatus as claimed in claim 2, in which the stylus and pressure pad are biased towards an end stop located at one end of said shaft whereby the stylus engages the fibre as it is being wound onto the other wheel and presses it into engagement with the preceding turn of fibre.

4. Apparatus as claimed in claim 1, in which a slot is provided in the other wheel allowing a fibre to pass therethrough and be secured to the inside rim of the wheel.

5. Apparatus as claimed in claim 1, in which said driving means are air turbines coupled to drive the wheels in opposite directions whereby the differential torque drives the wheels in the required direction.

6. Apparatus as claimed in claim 1, in which the stylus is provided with an adjustable collar to prevent overlying or twisting of the fibres.

7. Apparatus according to claim 3, in which the end stop is position-adjustable.

8. A method of winding coherent glass fibre strips, including the step of providing a supply of continuous glass fibre, winding said glass fibre onto the peripheral surface of a rotatable wheel mounted in air bearings and biasing each successive fibre turn into engagement with the preceding turn of fibre by means of a resiliently biased stylus reciprocally-movable across the peripheral surface of the said wheel.

References Cited

UNITED STATES PATENTS 2,623,240 12/1952 McDermott.
2,761,551 9/1956 Ballard _____ 242—47.08

NATHAN L. MINTZ, Primary Examiner